HIGH CONSTRAST IMAGE DEVELOPMENT METHOD AND ARTICLE

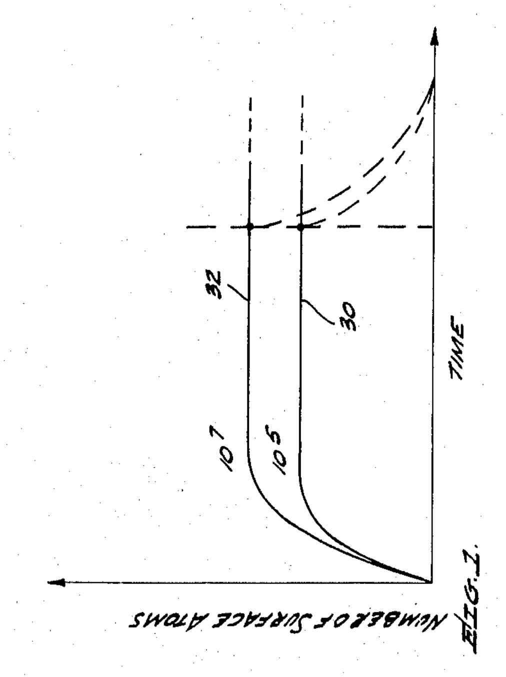
FIG. 1
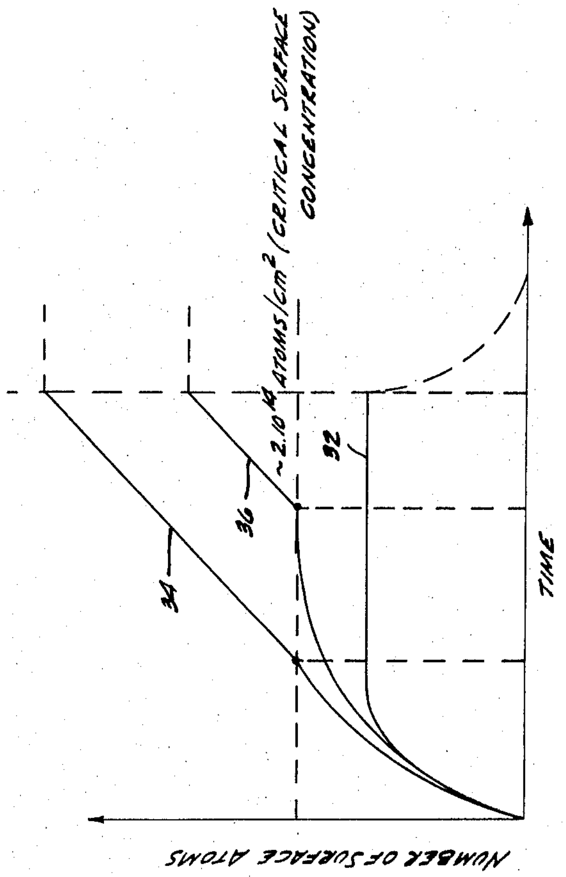
FIG. 2
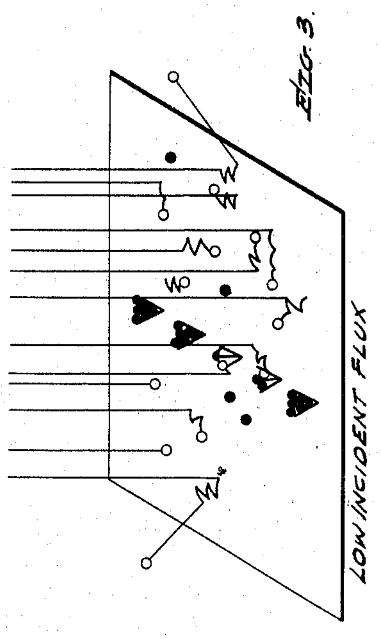
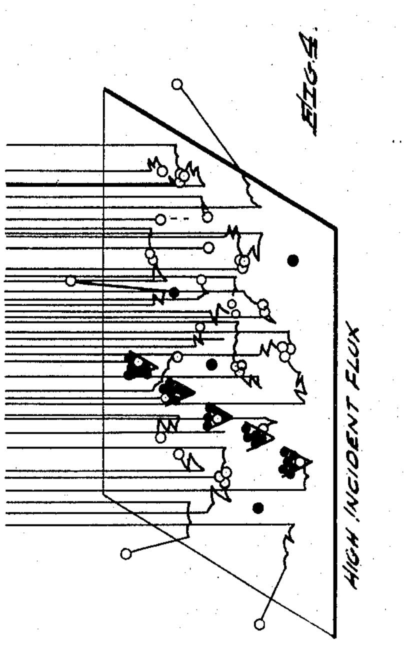

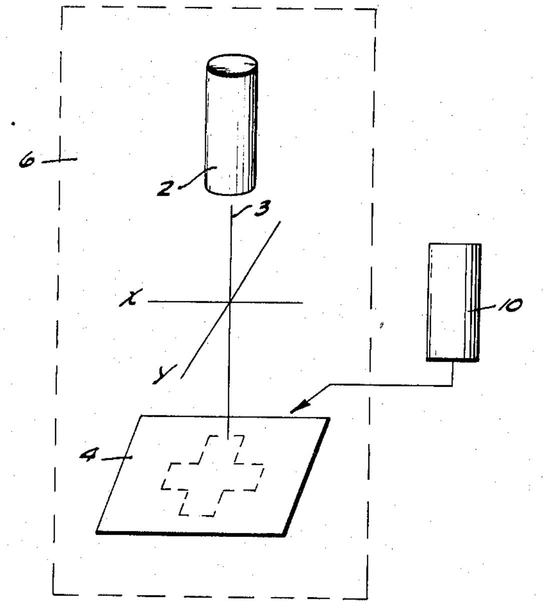
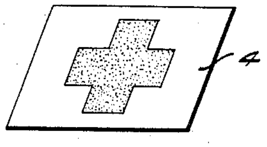
FIG. 7.
FIG. 5.
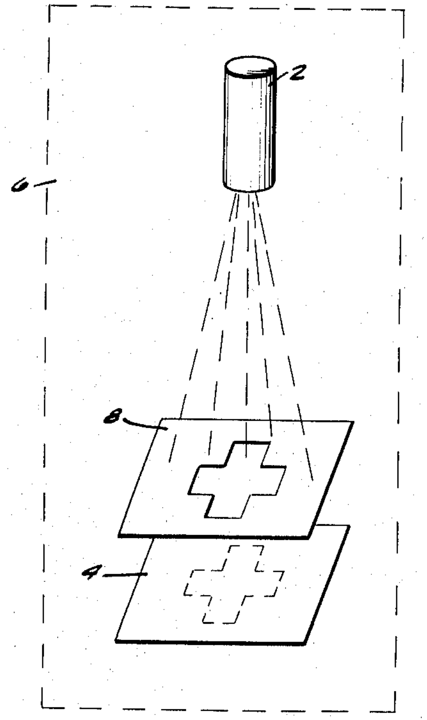
FIG. 6.

United States Patent Office 3,671,238

Patented June 20, 1972

3,671,238

HIGH CONTRAST IMAGE DEVELOPMENT METHOD AND ARTICLE

Alfred F. Kaspaul and Erika E. Kaspaul, Malibu, Calif., assignors to Hughes Aircraft Company, Culver City, Calif.

Filed Sept. 10, 1970, Ser. No. 71,043
Int. Cl. G03g *5/02*
U.S. Cl. 96—27 8 Claims

ABSTRACT OF THE DISCLOSURE

Methods for improving the contrast of images formed by depositing metal vapor atoms on actinic ray imagewise-exposed nucleated surfaces of nucleation recording medium and article produced thereby. Optical densities of over 2.0 are obtained by suitable moderation of the thermal energy of the vapor atoms such that the atoms form an amorphous image film which exhibits low specular reflectance. Moderation is achieved by use of low temperature and/or large area vapor sources, chemical interactions with the source or energy exchange between the vapor atoms and secondary gases or wall surfaces within the developing chamber.

CROSS REFERENCE

As to common subject matter, the applicants intend to rely for benefit of the filing date on patent application Ser. No. 839,271, filed July 7, 1969.

BACKGROUND OF THE INVENTION

(1) Field of the invention

The present invention relates to information recording and reproduction and, more particularly, this invention relates to a dry, near-real-time image system based on the selective deposition of metals or other suitable materials from the vapor state onto a latent image formed on the exposed surface of an actinic ray-sensitive nucleation recording medium.

(2) Description of the prior art

The selective deposition of materials, particularly metals, upon a preconditioned or what may be referred to as a "prenucleated recording medium," is known. Such selective deposition processes have employed various means for providing a prenucleated image which is invisible and latent. Thus, such prenucleated images have been formed by scanning a surface of a substrate with an electron or ion beam or by exposing the surface to a light image of the desired pattern.

Generally, the substrate has a smooth, stable surface with a low surface-free energy. Impingement of electrons, ions, or photons modifies the chemical composition of the surface to create areas of higher surface-free energy. Electrons or ions can cause dissociation of a metal salt to form areas of high-surface-free energy, so-called nucleation sites, or an ion beam may deposit the free metal directly. This process is termed "pre-nucleation." When a different metal is vaporized in a vacuum/chamber and subsequently permitted to condense onto the pre-nucleated substrate, the incident metal vapor atoms will deposit selectively on or around the nucleation sites because of their high adsorption energy. This process is termed selective adsorption or image development. On the unexposed areas of a prenucleated substrate, the re-evaporation rate will nearly equal the incident rate and there will be no deposition, while on the nucleation sites, the re-evaporation rate will be very low. Molecular amplification occurs in the sense that a single nucleation site will collect many thousands of atoms, thus producing a dense deposit.

In U.S. Pat. No. 3,140,143, issued to the instant inventors, the formation of such prenucleated images is achieved by depositing at least trace amounts of an aqueous liquid in preselected portions of the surface of a substantially inert, anhydrous solid substrate which has an inorganic metal compound as a part of its surface. Such a surface is typically provided according to this patent by means of a thin film consisting of zinc oxide incorporated into a resinous binder, such as a coplymer of butadiene and styrene. The latent image on such a substrate surface is formed by depositing water, for example, in the pattern desired upon such surface. The image is then developed by exposing this surface to vapors of a metal in a vacuum chamber, the metal atoms being selectively deposited upon and in accordance with the aqueous liquid pattern.

Similarly, in U.S. Pat. No. 3,235,398, the instant inventors have disclosed recording media and processes for recording thermal or infrared information where substrates such as mica, baryta paper, and polyethylene terephthalate films, with finely divided zinc oxide in an organic binder, are coated with a very small amount of materials such as nickel, silver, copper, cuprous chloride, bismuth or bismuth oxide by in vacuo deposition. Such deposited materials, according to this patent, serve to pre-sensitize, uniformly, the surface of the recording medium by forming nucleation sites which aid in the selective deposition of vapor during development of an infrared image focused on the surface of the recording medium. In this system, it is necessary to simultaneously or substantially immediately expose the recording medium to the development vapor with exposure to the infrared image, since the infrared image appears to have no lasting effect upon the recording medium.

As noted previously, another procedure for obtaining the requisite pattern of prenucleated areas is by scanning or otherwise exposing the surface of a substrate with electrons, ions or photons and, thereafter, developing the laten image thus formed by exposing the surface to metallic vapor so that the metal atoms are selectively deposited and grow upon and in accordance with the prenucleated pattern. Such a process is described by the present inventors as applicable for fabricating microcircuits in a paper, entitled Application of Molecular Amplification to Microcircuitory, published in the 1963 Transactions, Tenth National Vacuum Symposium, American Vacuum Society. The process described therein, as well as the phenomena involved in the present invention, are called "molecular amplification" because the nucleated sites selectively capture many ten thousands of atoms or molecules of the depositing or condensing material. The term "molecular amplification" describes the collection effectiveness of each nucleation center which captures a much larger number of atoms or molecules from the surrounding vapor than they contain themselves.

Thus, invisible nucleation centers, on the surface of the medium, established by various means such as by electrons, ions, molecules or photons, containing about $10^{13}$ atoms per cm.$^2$ (which corresponds to about 0.01 monolayer), become visible by collecting a total of about $10^{17}$ atoms per cm.$^2$. This means that each atom in a nucleation center has captured at least 10,000 atoms from the incident vapor (or molecular beam, which phrase is customarily used to describe material vapor directed toward the substrate surface as a vapor stream or beam). The overall collection efficiency of these media is strictly controlled by effective nucleation centers resulting from interactions of electrons and photons with the outermost surface layer on a chosen substrate. This very thin layer is produced either by predeposition of an electron or photon-sensitive compound, such as described previously, or by having a gaseous compound in contact with the substrate at all times, such as described in U.S. Pat. No. 3,378,401. However, because of the very small cross-section of thin surface layer interacting with photons or electrons, a large portion of the incident radiation is lost into the subsurface.

In our copending application, Ser. No. 839,271, filed July 7, 1969, the disclosure of which is incorporated herein by reference, photons or electrons are at first intercepted by a photon or electron-sensitive material, such as zinc oxide or other suitable compounds, which is of sufficient thickness to absorb most of the incident radiation. It is assumed that this results in an energy transfer from the irradiated zinc oxide to a nucleation-inducing compound which is intimately dispersed with the zinc oxide in a suitable binder. It is further assumed that this transfer results in the generation and subsequent migration of metal ions to the surface nucleation sites where neutralization by trapped electrons produces a stable nucleation cluster. The contribution by the volume or bulk of the recording medium to the overall gain of the deposition process is achieved by incorporating a nucleation-inducing agent in a film-forming binder in which is dispersed a material sensitive to electrons, ions or photons. The result is a net gain of three to four orders of magnitude, as compared to prior film type of media which depended solely upon surface phenomena. In contrast with prior recording media, the bulk effect recording media unexpectedly provides substantially the same effect upon condensation of atoms and molecules from the vapor phase thereof for a substantially lesser amount of initiating (exposure) energy. Stated another way, the bulk effect recording media unexpectedly obtains a dramatically increased condensation efficiency; i.e., by many orders of magnitude for the same amount of initiating exposure energy; e.g., one electron may initiate the deposition of $10^7$ atoms.

The maximum reflective densities obtainable on development of nucleation recording media seldom exceeded unity. In fact, most of the developed images are limited to a density of about D=0.8, and polarized light has been employed for image enhancement. However, electron beam exposed samples of the bulk effect nucleation recording media exhibited upon development with zinc metal vapor, image densities of D=1.00 to 1.20. This was measured by scanning the developed images of the recording medium with an electron beam. Because the medium is largely composed of zinc oxide, light is generated directly below the image plane, and the photon flux is modulated by the density of the images. A photodetector measured the amount of light attenuation in each spot, and thus resulted corresponding values for the transmission densities.

It was thought that a transmission density greater than unity should result in nearly twice this value for reflected light, because the light rays are attenuated upon entering the images, as well as upon leaving once they have been reflected by the zinc oxide beneath the image plane. Unfortunately, this is not readily achieved due to the inherently high specular reflection of thin metallic films.

One of the causes of the observed low reflective densities is the quite perfect crystalline structure of the metal films. Therefore, control of the selective deposition of metal vapor atoms in a manner to form a more amorphous or filamentary structure would permit the image to exhibit enhanced light-absorbing capabilities. The amorphically-deposited metal vapor will appear black, as contrasted with the grey-appearing crystalline deposits resulting in enhanced image contrast.

OBJECTS AND SUMMARY OF THE INVENTION

It is, therefore, an object of this invention to provide a new and improved actinic ray-sensitive imaging and recording system.

A further object of the invention is to provide developed nucleation recording medium having enhanced image contrast.

Still another object of the invention is the provision of a process for forming amorphically-grown visible metal deposits on photon and/or electron beam exposed prenucleated nucleation recording medium.

Yet another object of the present invention is the development of latent nucleation images to form visible, high contrast and low specular reflectance images from metal vapor in near-real time for rapidly producing permanent, visible patterns of predetermined geometry or records of information.

These and other objects and many other attendant advantages of the invention will become apparent as the description proceeds. These purposes are achieved according to the invention by developing the actinic ray-exposed, prenucleated recording materials or media with use of sufficiently low thermal energy metal vapor atoms such that an amorphically-grown image deposit is formed. The low thermal energy atoms may be provided by use of a low termal energy source and/or providing means for thermalizing or extracting energy from the atoms during their travel from the source to the surface of the prenucleated medium.

The invention will become better understood by reference to the following detailed description, when considered in conjunction with the accompanying drawings.

BRIEF DESCRIPTION OF THE DRAWINGS

FIG. 1 is a set of curves illustrating the equilibrium concentration of surface atoms as a function of incident rate;

FIG. 2 is a set of curves illustrating the effect of electron beam interaction;

FIG. 3 is a schematic perspective view illustrating selective deposition upon nucleation sites at low incident flux;

FIG. 4 is a schematic perspective view illustrating selective and random background deposition at high incident flux;

FIG. 5 is a schematic illustration of the use of a scanning beam to establish a latent nucleated image pattern on nucleation recording media;

FIG. 6 is a schematic illustration of the use of an actinic flood beam and image defining to establish said pattern;

FIG. 7 is a schematic perspective view of a substrate containing a developed image;

DESCRIPTION OF THE PREFERRED EMBODIMENTS

Figure 8:
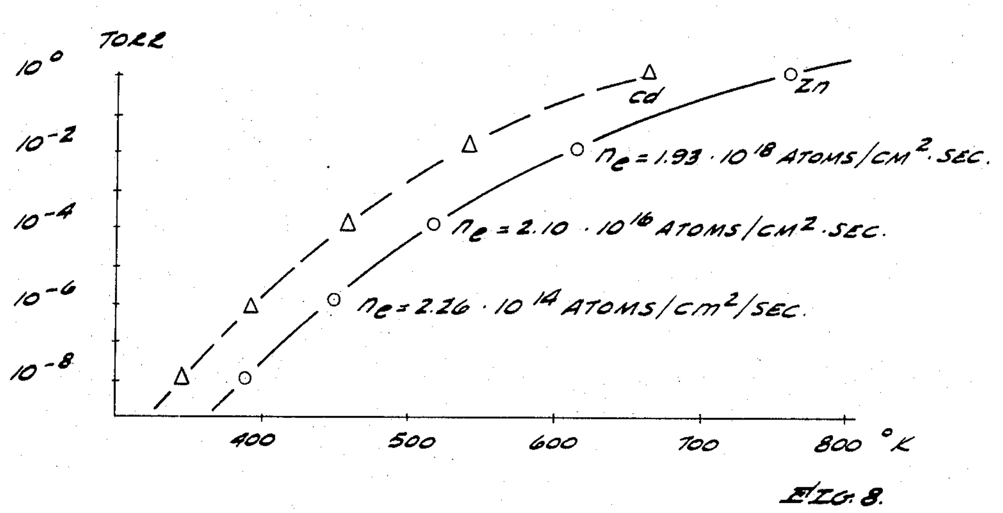
FIG. 8 is a set of vapor pressure curves for zinc and cadmium.

It should be understood that broadly the present invention relates to the formation of an image on a recording medium which image is initially not necessarily visible, but may be rendered visible and "read" electronically. Such images are, therefore, hereinafter referred to as "latent." Furthermore, the term "image," as used herein, is intended to mean the entire area of the surface of the recording medium or any portion less than the whole thereof, including patterns which visually impart information (such as words or pictures) or which patterns perform some esthetic or utilitarian function (such as a decorative design or electrically conductive paths for so-called "printed circuitry").

More particularly, the invention relates to the formation of image areas by the process of exposing a recording medium to electrons, ions or photons whereby the exposed areas of the medium appear to function as what may be called nucleation sites on which one or more materials may be selectively deposited from the vapor phase thereof and thus rendered visible or otherwise useful. The exposure process is referred to hereinafter as "selective nucleation," by which is meant the establishment of such nucleation sites in or on the recording medium, which nucleation sites are capable of attracting vast numbers of atoms or molecules or other particle forms of a vaporous material to which the recording medium is exposed. This nucleation is selectively established in response to impingement of the recording medium by electrons, ions or photons. The invention preferably utilizes the more efficient bulk effect recording medium materials, which are capable of forming increased numbers of nucleation sites in response to exposure by light or by a bombarding and scanning electron or ion beam. These nucleation sites are developed (rendered visible or otherwise useful) by the vapor-deposition of metals.

The process of development, termed "selective condensation" herein, is best understood from the following explanation. Upon exposure of a given surface, such as glass, or plastic, to an incident flux of atoms and/or molecules from a molecular oven or other vapor source, atoms and/or molecules will condense upon the surface, at first moving about it random fashion. At low incident rates, a certain number of atoms will be present on the surface at any given time and the equilibrium concentration is reached as soon as the evaporation rate equals the incident flux.

Molecular amplification results from manipulation of surface free energies leading in turn to the selective acquisition of a large number of atoms by effective nucleation sites. The amplification or gain may then be defined as the total number of atoms so captured divided by the number of atoms in these nucleation centers. To illustrate this phenomenon more clearly, when a surface such as a glass slide is exposed to an incident flux of atoms from a molecular oven, atoms of given thermal energy arrive at the surface, move about it in random fashion, and eventually re-evaporate after a given time interval has passed. For low incident rates, a certain fixed number of atoms will always be found upon the surface and the atom population rises and falls with the incident flux. However, once a critical incident rate or critical surface concentration is exceeded, auto-nucleation commences. This is due to the greater collision frequency experienced by atoms moving about the host surface, resulting in rapid formation of stable nucleation centers. Thus, a drastic reduction of the number of re-evaporating atoms ensues and nearly every incident atom must be captured from there on.

Generally, this is the chosen method for the non-selective deposition of in vacuo deposited thin films, and most commercial processes are largely based upon the formation of auto-nucleation centers. As long as the incident flux is kept low, no single atoms will remain on the host surface once the influx of atoms is halted. However, with a steady increase in incident rates, one must expect to find more and more a tendency of forming random centers (twins, triplets, and stable clusters) which are in direct competition with the image-forming sites. Above the critical incident rate, all incoming atoms must be captured as soon as auto-nucleation commences. Hence, for the selection of atoms without any "background," one has to stay clear of auto-nucleation at all times and the critical incident flux cannot be exceeded even for a very short moment.

Under carefully controlled conditions, rates as high as $10^{19}$ atoms/cm.$^2$·sec. may be utilized, and imagewise, selective deposition can be accomplished to the extent of many thousands or even ten thousand atom layers per second. Hence, even a thick deposit is produced in less than one second. Because the required film thickness for image and data storage applications is much less, no more than several hundred atom layers, a "picture" may be fully developed in 10 to 50 milliseconds without unduly bringing up the "background."

Analyzing a situation which is predominant at low incident rates, where surface equilibrium always exists after a short time interval, the rate of incident atoms ($n_i$). is counter-balanced by the rate of re-evaporation ($n_e$). This rate is given by $$n_e = N_{ad}\cdot A\cdot \exp\ (-\phi_{ad}/RT)$$

The condensation rate is then $$\frac{dN_{ad}}{dt} = n_i - n_e = n_i - N_{ad}\cdot\ \exp\ (-\phi_{ad}/RT)$$

Where $\phi_{ad}$ represents the adsorption energy between a single atom and its crystal surface and may be assumed to be ⅕ to ½ of the heat of sublimation. Integrating and expressing in logarithm of base 10, the next above equation becomes $$\log \frac{n_i}{N_{ad}} = \log A - (0.434)\cdot(\phi_{ad}/RT)$$

$n_i$=Incident flux (atoms·cm.$^{-2}$·sec.$^{-1}$)
$n_e$=Re-emitted atoms (atoms·cm.$^{-2}$·sec.$^{-1}$)
$N_{ad}$=Number of surface-adsorbed atoms (atoms·cm.$^{-2}$)
A=Frequency constant $\approx 10^{14}$ for most metals
$\phi_{ad}$=Estimated heat of adsorption (kcal.·mole$^{-1}$)
R=Gas constant (1.987 cal.·deg.$^{-1}$·mole$^{-1}$)
T=Temperature in degrees Kelvin (° K.)

Choosing zinc for the incident atoms ($\phi_{ad}$ zinc-glass estimated to be 2.4 kcal./mole), and a surface temperature of the glass substrate at about 258° K., this equation will lead to $$\log \frac{n_i}{N_{ad}} = 12.0$$

Hence, the surface concentration of zinc atoms at equilibrium will be either $10^5$ or $10^7$ atoms/cm.$^2$ with incident rates of $10^{17}$ or $10^{19}$ atoms/cm.$^2$·sec. respectively.

At such low surface concentrations, it may be safely assumed that no twins or triplets are formed; thus, all atoms will eventually leave the surface upon cessation of the incident flux. FIG. 1 illustrates the resulting surface concentrations of zinc atoms for the two incident rates discussed above.

Experiments have shown that several hours may pass without leaving any zinc deposit upon a glass surface under such conditions. However, this may be changed at will by pre-nucleating the glass slide in selected areas with e.g., a small number of atoms from materials of greater heat of sublimation than the depositing material. FIG. 3 indicates the lower flux rate, and FIG. 4, the higher rate. A much higher incident rate tends to favor the formation of auto-nucleation centers which, in turn, develop the unwanted "background." However, this may be averted by choosing proper conditions and especially by maintaining incident rates below critical.

Although the influence of pre-nucleation centers upon the depositing atoms is qiute complex and requires further discussions, it can be assumed that, for given experimental conditions, the effective free surface energy of these centers amounts to 12 kcal./mole. This is very much greater than any point on the "clean" glass surface.

Consequently, $$\log \frac{n_i}{N_{ad}} = 4.0$$

Taking this into account and assuming, again, an incident rate of $10^{19}$ atoms/cm.$^2$ sec., the corresponding surface concentration woudl be $10^{15}$ atoms/cm.$^2$, a value much too large to maintain an equilibrium, even for a very short time; thus, a rapid film build-up occurs, and many thousand atom layers are deposited in less than one second. We are now faced with two extremes: On one hand, all incident atoms will be re-evaporated from a given surface if nucleation centers are absent; on the other hand, a rapid and complete acquisition of every available atom is observed once effective centers are being generated by some controllable means. This is in essence an "atom-switch" very much like a gas discharge tube. The "firing voltage" is, in this case, the critical surface concentration which was found experimentally to be of the order of $2 \cdot 10^{14}$ atoms/cm.$^2$. Above this value, instant deposition occurs; below critical, no stable deposits exist.

FIG. 2 shows the number of captured surface atoms versus time with $\phi_{ad}/RT$ as parameter.

For a fixed incident rate, curve 2 shows the equilibrium condition of the background which should have always a very low effective free energy. Curve 36 depicts the lower and curve 34, the higher value for $\phi_{ad}/RT$. From it, one may conclude that there is a definite time difference in each case for the onset of condensation and, consequently, a difference in the total number of deposited atoms at any given moment. Thus, proper modulation of the onset of condensation produces continuous tone images, even though the deposition process is "go" or "no-go" in character. Upon cessation of the incident flux, the background atom population will eventually be reduced to zero, whereas all deposits above critical remain at their respective levels at cut-off (t).

Nucleation surface chemistry phenomena are quite complex and proper correlation of experimental results with existing theories is far from being a simple operation. Nevertheless, the experimental results are repeatable. In short, a selective thin film imaging and data recording process must be considered as consisting of two steps. First, the effective surface free energy is modified to produce the desired pattern of surface sites which have the ability to initiate the crystal growth of another material. Next, the surface is exposed to either (1) a molecular beam of the depositing material which then condenses atoms or molecules selectively onto the special sites; or (2 contacted by a liquid to effect the selective plating of a metal; or (3) to a gaseous compound resulting in selective dissociation and subsequent deposition of the desired material. Because each site may capture many thousands of atoms or molecules, amplification results.

Exposure and development, as described above, has been successfully performed in a prototype recorder operating at tape speeds of from several inches per second up to more than 80 inches per second, whereby recording development and read-out occur in near-real time. The corresponding writing, develop and then read-out stations are sequentially arranged and, thus, separated by several frames. The maximum image density produced still permits a signal/noise ratio of about 30 to 35 db @ 10 mHz. However, for near-real time, optical projection required in large screen display applications, maximum reflective density of D=0.8 is barely acceptable without polarization of both the incident and reflective light resulting in a considerably reduced efficiency.

PRE-NUCLEATION METHODS

Generally, materials best suited for prenucleation are characterized by atoms having heats of sublimation ($\Delta H_s$) always exceeding those of the developer atoms. Several materials appropriate for nucleation and development at surface temperatures of about 300° K. are listed in Table I along with their values of ($\Delta H_s$).

TABLE I.—SELECTED MATERIALS FOR NUCLEATION AND DEVELOPMENT AT 300° K.

| Nucleation | | Development | |
|---|---|---|---|
| Material | $\Delta H_{Sub,\ 298° K.}$ | Material | $\Delta H_{Sub,\ 298° K.}$ |
| Ag | 68 | Cd | 27 |
| Sn | 72 | Zn | 31 |
| Cu | 81 | Mg | 35 |
| Au | 88 | | |
| Cr | 95 | | |
| Ni | 100 | | |
| NiCr | 100 | | |

For surface temperatures of about 800° K., more material combinations are possible. Some of these are listed in Table II.

TABLE II.—SELECTED MATERIALS FOR NUCLEATION AND DEVELOPMENT AT 800° K.

| Nucleation | | Development | |
|---|---|---|---|
| Material | $\Delta H_{Sub,\ 298° K.}$ | Material | $\Delta H_{Sub,\ 298° K.}$ |
| Sm | >50 | Pb | 47 |
| Be | 75 | Bi | 48 |
| Er | 75 | Sb | 49 |
| Pd | 89 | In | 58 |
| Cr | 95 | Ag | 68 |
| Fe | 99 | Sn | 72 |
| NiCr | 100 | Cu | 81 |
| Ni | 100 | Au | 88 |
| Co | 102 | | |
| Si | 107 | | |
| Ti | 113 | Compounds | |
| U | 117 | | |
| V | 123 | PbO, PbS, PbSe, PbTe CdS, CdSe, CdTe | |
| Rh | 133 | $Sb_2O_3$, $Sb_2S_3$ | |
| Zr | 145 | $Bi_2O_3$ | |
| Ir | 150 | | |
| Mo | 158 | | |
| Nb | 172 | | |
| Ta | 186 | | |

The adsorption energy ($\phi_{ad}$) between a single atom and its crystal surface is about ⅕ to ½ the heat of sublimation. The use of photons, electrons or ions of low $\phi_{ad}$ metals excludes the formation of nucleation sites in the absence of a surface layer or proper composition. Certain substrates such as ceramics, which contain oxides of Mg, Al, Be, Si are not directly suitable for electron and gas-ion beam sensitization. It is, therefore, necessary to precoat the substrates with a thin film of a compound presenting initially a surface with a minimum number of effective nucleation sites. Photons, electrons or low $\phi_{ad}$ metal ions produce the required nucleation sites upon impingement of the substrate.

Many different techniques can be utilized to generate nuclei on a variety of substrates. Several selected methods will be described by way of exemplification.

The exposure of the nucleatable recording medium to electrons, ions or photons may be in the form of a scanning beam or a mask-formed pattern thereof, whereby a latent image is established on or in the medium in a form corresponding to that portion of the medium exposed to the beam or pattern. The latent image may be developed to render the image visible as a bonded pattern or image which permanently remains in place. This image may be a conductive pattern, as for an electrical circuit, a pictorial or textural or symbolic information, in which case the recording may be immediately viewed or read and then stored for subsequent reading or viewing.

The nuclei may be generated by many different techniques. The electrons, ions or photons may be formed in relatively narrow actinic ray beams and caused to scan the recording medium to establish the desired pattern of nucleation centers. Such a scheme is depicted in FIG. 5, where a beam source 2 is provided to generate a beam 3 of ions, electrons or photons with which to scan a recording medium 4 according to the invention. The beam 3 is capable of being deflected orthogonally, as indicated by the X–Y axes, by means of apparatus and techniques well-known in the art. A beam of light or photons may be generated and caused to scan the recording medium 4 by a cathode ray tube, particularly of the type known as "flying-spot scanner." The electron beam may be generated by any of the well-known electron gun devices used in cathode ray tubes, for example. In the cases where scanning and nucleation are accomplished by ions or electrons, it will be appreciated that beams of these energy forms must be generated in vacuo and the recording medium 4 will also need be exposed thereto in vacuo.

The requisite vacuum chamber 6 is indicated in FIG. 1 by dotted lines, since it may be of any design or structure to accomplish the purpose of permitting an evacuated volume to be established and maintained therewith. Development may be accomplished directly within chamber 6 by feeding development atoms into the chamber from a vapor source 10 either during or after nucleation. The application of development vapor atoms to the prenucleated recording medium 4 results in the selective development of a metal image film 5, as illustrated in FIG. 7. Normally, since it will be desirable to insert and remove recording media (either discretely or continuously), parts (not shown) for such purposes will be provided in the vacuum chamber structure. Likewise not shown are the necessary means for pumping down or evacuating the chamber 6 whenever the desired vacuum therewithin is lost, as by opening the chamber to remove recording media. It will also be understood that, since the recording media of the present invention are usually light-sensitive, the recording step should be carried out in a light-tight or dark box which excludes light of the frequency or frequencies to which the recording media are sensitive. In the case of optical or photon exposure, however, it is not necessary to provide a vacuum for the exposure step.

In the ion beam embodiments, the material with a relatively high value of ($\Delta H_s$), such as tantalum or chromium, is vaporized with the assistance of an electron beam. The ionized metal-vapor is then injected into the electro-optical system of the ion beam unit and it finally impinges in a controlled manner on the substrate. In an electron beam embodiment, the predeposition of a monomolecular film of a halide, such as $NiCl_2$ or $NiF_2$ will provide a reservoir of potential nucleation centers which are activated on impingement by the electrons and noble-gas ions. Metals, such as gold or platinum, which cause nucleation when present as cations also caused nucleation when present an anions, for example, chloroaurates or chloroplatinates.

In FIG. 6, another arrangement is shown for accomplishing the recording or exposure by molecules, electrons, ions or photons, but without requiring the formation thereof into narrow beams and the line-by-line (or point-by-point) scanning of the recording medium thereby. In this embodiment, an image-forming member or mask 8, different portions of which are transmissive and non-transmissive to molecules, electrons, ions or photons, is provided adjacent a recording medium according to the invention so as to intercept some or all of a flood or blanket beam of electrons, ions or photons. Thus, the recording medium will be exposed to be sensitized in a pattern corresponding to the transmissive and non-transmissive portions of the image-forming member or mask. This mask may be in the form of a non-transmissive plate having pattern of image-defining cut-out portions. It may also be in the form of a photographic negative or the like. In these two instances, penetration through the image-forming member by unintercepted electrons, ions or photons is contemplated. However, the terms "transmissive" and "non-transmissive" are used in their very broadest sense to include not only passage through the image-forming member, but the interception or non-interception by reflection or adsorption of electrons, ions or photons as well. Thus, any document which is capable of selectively reflecting light, for example, is accordance with the characters or patterns thereon, may also be used to determine the pattern of the energy impinging on the recording medium so that a replica of the document may be ultimately reproduced thereon, in accordance with the invention. Again, it will be appreciated that electronic and ionic exposure will be carried out in vacuo, while photon exposure may be carried out in a non-evacuated, but light-tight chamber. By "light-tight" is meant at least the exclusion of light of the frequency or frequencies to which the recording medium is sensitive.

Flood sources for electron or ion beams may be the same as discussed above. In a molecular beam embodiment, a flood source for various materials, e.g. silver, nickel or chromium are vaporized and directed toward the substrate. The thin mask located between the vapor source and the substrate controls the distribution of the deposit. This method has the advantage of producing nucleation patterns of sharply-defined boundaries having a high resolving power on development. Since the resulting latent images do not require more than $10^{15}$ atoms per square centimeter, the imaging mask may be reused many times before acquiring any appreciable deposit. This contrasts quite favorably with the normal use, such as masks which have to intercept all of the material to be deposited upon a given substrate, e.g., $10^{18}$ atoms/cm.$^2$ in most cases.

DEVELOPMENT

In accordance with the invention, pressure, gas composition, surface area of vapor emitter, deposition speed and other parameters have been investigated and optimized to provide improved optical adsorption of the selectively deposited films resulting in reflective densities of over 2.0. It has been determined that moderation of the energy of the vapor atoms results in high reflective density, low specular reflectance deposits.

The vapor pressure curves for zinc and cadmium are illustrated in FIG. 8. Assuming a transfer coefficient of unity, the corresponding evaporation rates have been written on the zinc vapor pressure curve for pressure of $10^{-6}$, $10^{-4}$ and $10^{-2}$ torr. For large surface area sources, sufficient zinc or cadmium atoms can be emitted at reasonable low temperature of below 500° K., and suitably below 450° K. Under otherwise equal conditions, at the same incident flux rate, the larger the area of the source, the darker the image appears.

Statistically, for a given surface area at a given temperature, atoms are emitted over a range of higher and lower energy. To obtain the same flux from a point or small area source, the temperature of the source must be much higher and, therefore, the thermal energy of the emitted atoms is very high. Larger numbers of low thermal energy atoms are emitted by a large area source at lower temperatures and the low thermal atoms deposit in a less ordered manner to form low specular reflectance, darker-appearing films.

Figure 9:
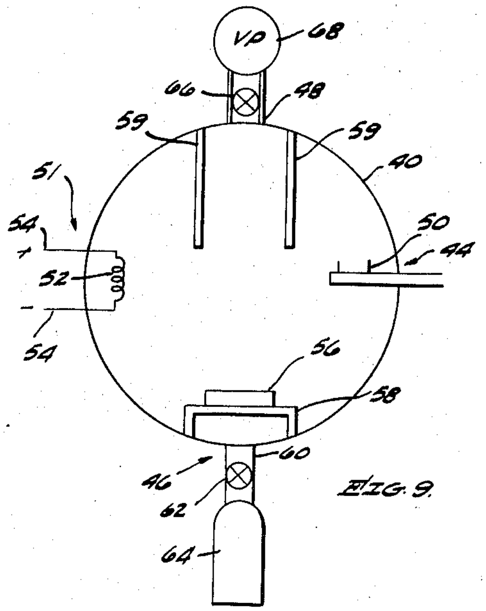
FIG. 9 is a schematic illustration of a vacuum development chamber.

Experiments were conducted in the apparatus illustrated in FIG. 9. The apparatus comprised a vacuum chamber 40 with various feedthroughs for a point source 44, large area source 53, backfill gas feed 46, and vacuum line 48. The point source was a boat 50 in which was placed a pellet of zinc. The boat was heated to about 420° C. to form a pool of zinc liquid having an effective emitter area of 0.25 $cm.^2$.

The large area source 51 was a zinc-electroplated copper or nickel wire 52 having an effective emission area of at least 25 $cm.^2$. The ends 54 of the coil are connected to a source of potential, not shown. The coil was kept within a temperature range of 180° C. to 250° C. during deposition, preferably between 170° C. and 250° C. below the 420° C. melting point of zinc. A sample of nucleated film 56 is positioned on a substrate table 58 during deposition. Line 60 containing a needle valve 62 connects to a tank 64 of backfill gas. The vacuum line 48 containing a valve 66 connects to a vacuum pump 68.

The vacuum chamber was evacuated to $1\times10^{-2}$ torr in about 60 seconds and then backfilled with the desired gas mixture prior to energization of the point or large area zinc source. For the particular configuration of these experiments, the pressure is desirably maintained within the range of $10^{-2}$ to $5\times10^{-1}$ torr.

Using hydrogen backfill to about 100 millitorr, reflecting optical densities of about D=1.0 could be obtained with the zinc boat, whereas the large area coil source resulted in D=1.45.

At 150 millitorr hydrogen pressure, and employing the large source, D=1.72 generally results. Similar data were obtained with helium and also nitrogen, which resulted in D=1.9 at 200 millitorr.

Under otherwise equal conditions, large area low temperature sources produce greater optical densities. An increase in ambient pressure, especially with non-reactive gases, also increases reflective density up to a point where the zinc atoms are unable to reach the surface to be developed.

The thermal conductivity of the gas employed has a significant effect upon the maximum density, e.g., hydrogen will thermalize the zinc atoms at a lower ambient pressure than argon.

Figure 10:
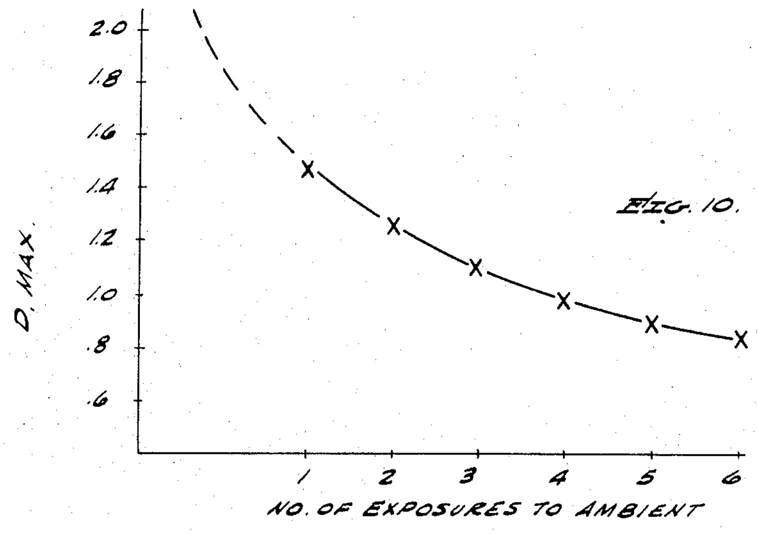
FIG. 10 is a curve illustrating the degradation of a large area source with successive exposure to ambient.
Figure 21:
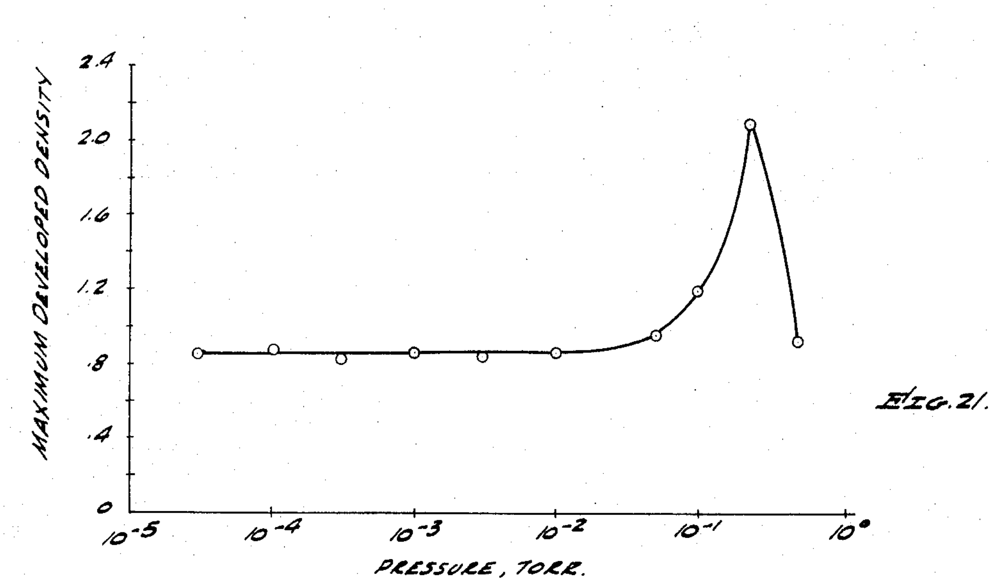
FIG. 21 is a curve illustrating the dependence of the reflective optical density upon the ambient gas pressure.

Reactive gases have considerable influence on the images produced and control the effective area and lifetime of the zinc sources. Referring now to FIG. 10, the successive exposure of the large area source to ambient atmosphere during insertion of new samples without waiting for cooling down resulted in a continuous degradation in measured reflective optical density.

This is a result of progressive oxidation of the zinc surface. Thus, even though oxygen can beneficially moderate and thermalize the zinc atoms by gas collision, its presence is detrimental to the source, forming a non-permeable, zinc oxide coating having a higher vaporization temperature. Furthermore, in a confined development chamber, there is a tendency for zinc atoms to redeposit onto the source or retransfer from one point to another location where the temperature is lower. There will be a continuous acquisition of zinc at these points forming loose deposits having poor heat transfer characteristics and, thus, are unavailable for further participation in development. Thus, the large area source is progressively transformed into a small area source and the temperature of the source must be raised to maintain the flux rate with resultant emission of higher thermal energy atoms, and deposition of a more perfectly-ordered, higher specular reflectance film.

Employment of a reactive gas mixture or reactive additive to the zinc to maintain an oxide-free surface obviates this problem. It was found that, by increasing the hydrogen content of the argon hydrogen mixture used to backfill the chamber to atmosphere to about 50 percent hydrogen, the lifetime of the zinc source improved considerably. However, eventually ambient air leaked into the chamber on opening and, in time, a new filament was required. Even with the use of vacuum transfer feed mechanism and backfill leakage of hydrogen gas into a continuous development recorder at a pressure of $10^{-4}$ torr, sufficient oxygen could leak in and react with and slowly degrade the effective area of the source.

The most desirable backfill atmosphere would be a gas which could moderate by gas collision and be reactive with the source to form a layer of protective compound that is capable of evaporation at or below the temperature of the source and decomposes on evaporation from the source, during transit to the medium or decomposes at the surface of the tape to deposit vapor atoms. The use of nitrogen gas has been found to be a most desirable backfill gas from this standpoint.

The introduction of nitrogen into the deposition chamber, combined with substantial exclusion of oxygen, is found to result in reaction of the nitrogen with the surface of the hot source during cooling to form a black deposit. This deposit has been analyzed as zinc nitride ($Zn_3N_2$). Unexpectedly, the effective areas of the source appears to increase with use of this environment and image deposits progressively increase in blackness. In a series of experiments, using nitrogen backfill, the density increased progressively from about D=0.86 to D=1.72.

Gas interactions have also been experienced by outgassing of components from within the tape. This is a very effective means by moderation of the thermal energy of the vapor atoms, since the gas collisions occur immediately above the surface of the tape, and the probability of collision under these conditions is very high. The tape absorbs gas particles during manufacture and a small percentage of the solvent for the binder is retained in the tape.

EXAMPLE I

A sample of bulk effect recording medium was prepared by adding together 35 grams of ZnO, as pigment; 0.018 gram CuCl, as nucleation inducing or enhancing compound; 9 grams of 30 percent solids in toluene solution of "Pliolite S-7"; and 50 ml. of toluene together in an orbital ball mill. (Pliolite S-7 is a resinous copolymer of butadiene and styrene manufactured and sold under that designation by Goodyear Tire and Rubber Co., of Akron, Ohio). The materials were milled together for 1.5 hours, using 100 grams of glass balls. The ratio of ZnO to dry binder was 13 to 1. The ratio of nucleation inducing compound to pigment was .00046 to 1. Thereafter, a film of the composition was applied by a knife-coater at a speed of 2 cm. per second on the aluminized surface of a paper tape. Tapes were prepared having wet film thickness of 100 microns and a dry film thickness of 28 microns. Other tape compositions, as disclosed in patent application Ser. No. 839,271, filed July 7, 1969, could alternatively be employed. The medium was exposed by an electron flood source having a flux of $10^{12}$ $electrons/cm.^2\cdot sec.$ for one second to produce the nucleated latent image and was inserted into the chamber which was pumped to 1.5 torr. At this time, the zinc coil was energized and pumping was continued for thirty seconds, the time constant of the coil, to a pressure of 80 mtorr, and the coil turned off. The tape developed to a density over 1.0 imaging at about 20 seconds.

EXAMPLE II

The chamber was backfilled with nitrogen, to atmospheric pressure, another sample inserted and pumped directly down to 80 mtorr in about 30 seconds with the coil on during this pumping period. The image density was again over 1, indicating outgassing is coincident with development.

EXAMPLE III

A further control was conducted by inserting a sample of tape into the chamber and the chamber pumped down for about 60 seconds to 50 mtorr. The chamber was backfilled with nitrogen and the development cycle of Example I was followed. The image background developed in this case which could only be avoided by decreasing envelopment time with a resultant loss in optical density.

These experiments indicate that the faster the tape is pumped and the sooner it is developed, the better the density, since development occurs before gas components within the tape are depleted in the high vacuum chamber. The results are not repeatable with a pumped tape backfilled with nitrogen, apparently nitrogen gas sorption is not responsible for the effect. The tape must be sufficiently permeable to retain gaseous components, but not permeable enough to resorb nitrogen at atmospheric pressure.

A further experiment was conducted to test the effect of backfilling with a small cross section atom, such as helium.

EXAMPLE IV

The sample was placed in the chamber and the chamber was pumped to 50 mtorr over a period of 60 seconds. The chamber was backfilled with helium to atmospheric pressure and then pumped down and developed, as in Example I. The reflective density was unchanged and about $D \geqq 1.30$. This illustrates the significant effect of specific gases upon the thermalization of zinc atoms.

Other factors may play a more important role, such as the large cooling effect of helium upon "vagabonding" zinc atoms still emanating from the warm coil at low ambient pressures.

In a more recent experiment, several nucleation recording media were exposed to a low lensity zinc flux leaving no visible deposits. Subsequent exposure to UV light and developed with zinc brought up the "background" much stronger than the image areas. Apparently, a randomly-formed sub-image of zinc was responsible for the "instant" onset of condensation of the background.

If need be, helium could be stored within the tape. However, such a gas storage is cumbersome and can only be maintained for a short interval. Therefore, it would be more effective to store and feed the gas from other sources within the chamber. The beneficial effects of nitrogen on the source and helium on surface moderation could be obtained by providing a mixture of these gases within the development chamber.

Figure 11:
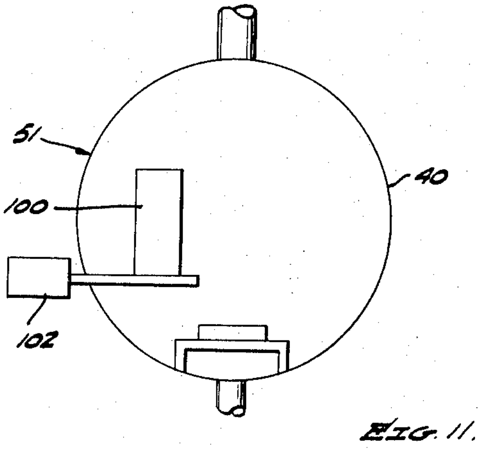
FIG. 11 is a schematic view of a deposition chamber incorporating a large area porous source formed from a solid alloy of a development metal.

Many configurations of large area sources become available for longtime service in the presence of a protective gas, such as nitrogen. These sources may be formed from the principal vapor depositing atoms, such as zinc or mixtures or alloys thereof, with other depositing atoms or non-depostiting atoms. For example, referring now to FIG. 11, a vapor depositing atom, such as zinc and a lower melting metal, such as lead, may be formed into a porous cylinder 100 by sintering a mixture of powders of zinc and lead. The cylinder may be heated by an indirect heat source 102 which may be a radio frequency source or by direct current passage through the cylinder 100. The powders could also be sintered into the form of large porous felt and heated in a similar manner. The pores in these sponge or porous-type materials might further moderate the thermal energy of the emitted atoms and make it more difficult for atoms to redeposit on the source. Zinc and lead do not alloy; however, they exist as two melts, whereby the zinc will float upon the molten lead surface. Thus, zinc may be reliably evaporated from a molten lead surface at a high rate.

Figure 12:
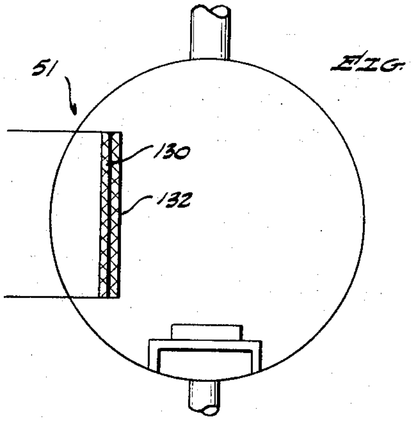
FIG. 12 is a schematic view of a deposition chamber including a fabric-covered wire source.

Referring now to FIG. 12, a very effective large area source has been constructed from a zinc wire 130 covered with a porous sleeve of woven wire 132, suitably tin-coated copper braid. Both of these materials are commercially available and do not require any special processing to form a large area source. They are simply cut to length and assembled. The porous mesh appears to be a very effective moderator in providing low thermal energy zinc atoms. Selective depletion and redisposition does not appear to be experienced, as was the case with the zinc-electroplate copper coil.

Figure 13:
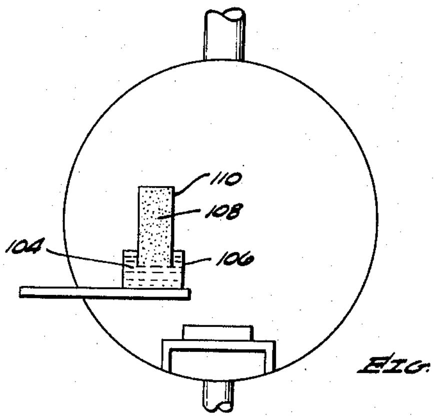
FIG. 13 is a schematic view of a source including a wick extending into a molten body of liquid metal.

Referring now to FIG. 13, the large surface area could be provided by means of a molten body 104 of zinc in a large crucible or boat 106, into which is disposed a wick 108 of zinc wettable material, such as a nickel sponge. The zinc flux could be controlled by controlling the length and, therefore, the surface area of the wick exposed above the level of the body of zinc. The molten zinc will flow upward by capillary action and wet the wick to form a film 110 and will evaporate from the surface of the wick.

Zinc and cadmium are soluble to a small extent in gallium or indium and form alloys which are liquid at the temperature of deposition. These alloys provide several configurations for very effective large area sources. Gallium (95 percent) forms an alloy with zinc having a eutectic at 25° C. However, a 50/50 mixture was found to be most useful, and operated above 250° C., gave very consistent results. Furthermore, gallium oxide has a larger negative heat of formation than zinc oxide and will, therefore, reduce the oxidation of the zinc to a lower level.

Figure 14:
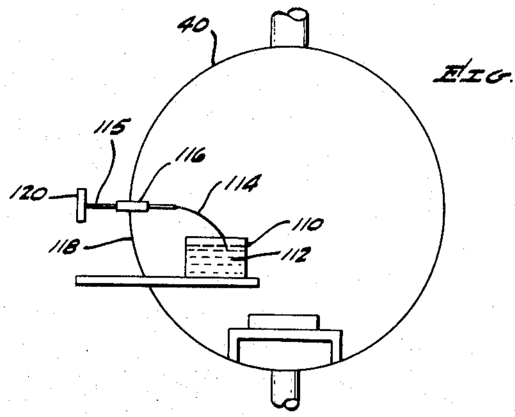
FIG. 14 is a schematic view of a metering arrangement of a broad area source utilizing a low melting temperature metal having limited solubility for the deposition metal.

The eutectic could simply form the basis of a zinc boiler or evaporation by heating a boat containing the alloy. A preferred form of this source is shown in FIG. 14. A boat 11 contains gallium liquid 112 into which is inserted a wire 114 of zinc. The zinc wire is connected to a screw feed 115 extending through a vacuum feed-through 116 in chamber wall 118 and connected to a handle 120. The screw feed 115 can be utilized to adjust the length of zinc immersed in the gallium and, therefore, the amount that dissolves and the amount evaporated from the source 51. This is a very effective and convenient way of metering and controlling the zinc flux rate.

Figure 15:
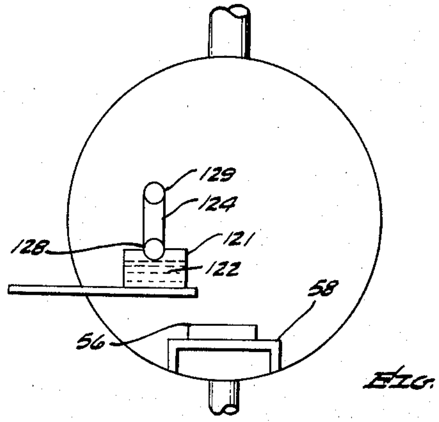
FIG. 15 is a schematic view of a large area source incorporating a recirculating endless belt transport.

Gallium, indium or lead could also be utilized as a recirculating transport fluid. As illustrated in FIG. 15, a boat 121 containing a liquid body 122 of the eutectic of Ga-Zn is disposed within a development chamber 40 adjacent the substrate table 58. An endless belt or tape 124 of material wettable by the alloy is disposed with one end surrounding drive roller 129 and one end surrounding an idler roller 128. The idler roller 128 is immersed at least partially in the liquid body 122.

The character, temperature and surface area of wall surfaces within the deposition chamber can have considerable influence on the deposition process. The vapor atoms emitted by the source spread out in a random manner and collide with surfaces of the walls and the tape before depositing on the higher free energy, nucleated image portions of the tape. Even though the system is operated at below critical, that is no consideration on wall surfaces other than the tape, the wall surfaces are capable of extracting a finite amount of heat energy during each collision with the vapor atoms and, thus, moderate or thermalize the vapor atoms.

To test the effect of wall area, additional wall area was introduced into the development chamber. Referring now to FIG. 9, thin sheets of aluminum foil 59 having a surface area of about 100 square inches were hung within the chamber 40 between the source 51 and the substrate table 58. A sample of nucleation recording medium 56 was developed utilizing the 1.5 torr/80 millitorr-30 second pump-down-development cycle using nitrogen gas for backfill. The density increased from 1.20 to 1.70.

The interaction of the vapor atoms with the aluminum wall surface results in very effective moderation of the zinc vapor atoms. This may be due to a combination of several effects. Aluminum, when exposed to ambient atmosphere naturally develops an aluminum oxide film several hundred angstroms in thickness. The oxidized surface may contain a film of absorbed gas. Therefore, each interaction of the zinc vapor atoms could involve both a gas collision and a heat exchange of the zinc atoms with the aluminum-aluminum oxide surface.

Figure 16:
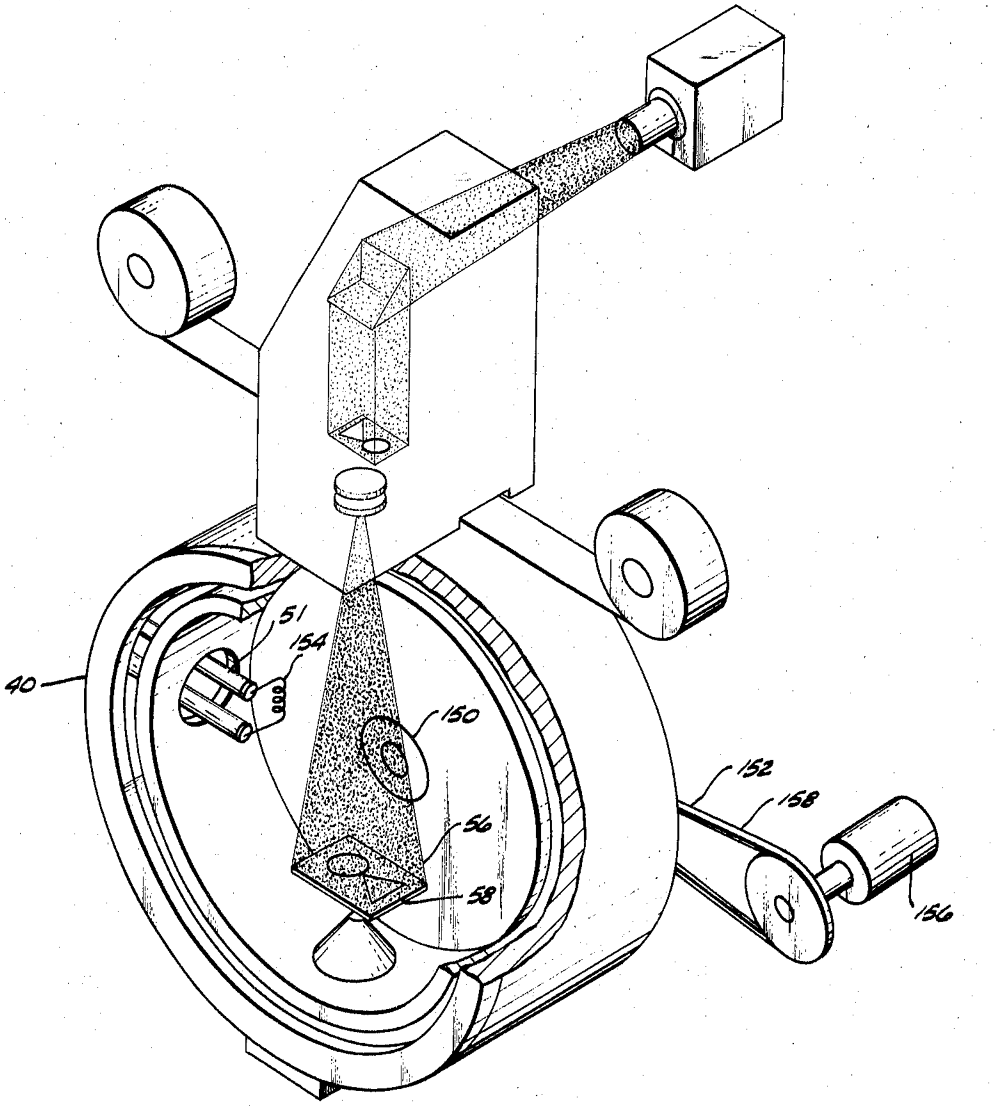
FIG. 16 is a perspective view of a development chamber including a moving wall.

Further experiments were conducted in the apparatus of FIG. 16 which contained a drive axle 150 mounted through the rear wall thereof. The axle was driven by motor 156 through drive belt 158. Various discs 152 were mounted on the axle and rotated during development to explore the effect of moving wall surfaces on the deposition process. A large area zinc-plated copper coil source 154 was disposed such that the vapor emission was directed toward the disc 152. Deposition was conducted with the 1.50 torr/80 millitorr/30 sec.-nitrogen pump-down and development cycle discussed above.

With the wall stationary, zinc will condense within a few operational cycles, and frequent cleaning is mandatory. Because the zinc source is so closely spaced in reference to the wall, incident rates are well above critical and autonucleation may occur at any time.

Figure 22:
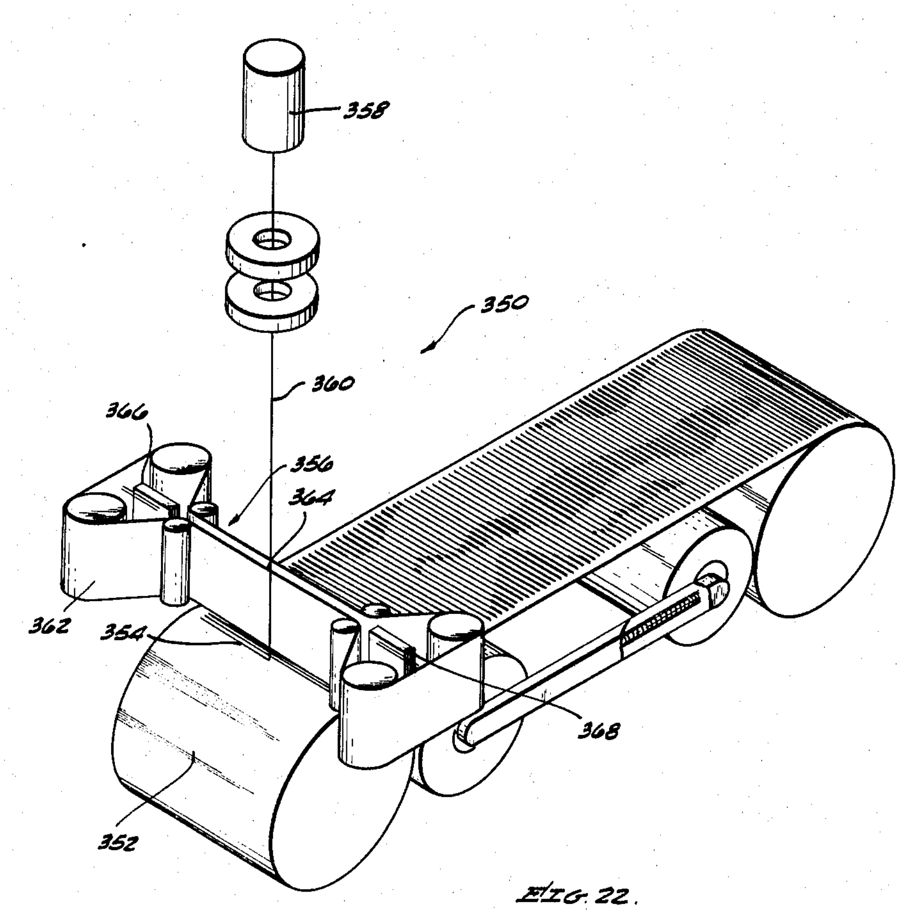
FIG. 22 is a schematic view of the Moving Wall Developer.

However, once the disc is rotating sufficiently fast, no condensation is noticeable, and full advantage may be taken of thermalizing the zinc atoms, e.g., a plexiglass disc, rotating at about 500 r.p.m. permitted the development of a maximum density of D=1.76 with the point source and of D=1.92 with the area source. The idea of thermalizing zinc atoms by repetitive interactions with moving walls has lead to a novel concept, as shown in FIG. 22. This Moving-Wall-Developer will be discussed in more detail later on.

The rotating development chamber described in Pat. No. 3,585,965 is similar in concept and represents optimum configuration for thermal moderation of the vapor atoms under the condition imposed. A tape is supported at its edges by two rotating discs. The tape forms the circumference and the two large area discs define the side walls of the rotating development chamber. The vapor atoms bounce back and forth within this confined area and are moderated by frequent collisions with the wall surfaces, as well as the ambient gas atoms before depositing on the nucleated image areas of the tape. The discs may be constructed of various materials, such as glass, Plexiglas, aluminum, etc., or may be modified physically, such as by being rendered porous or coated with a low free energy material, such as Teflon, silicone oil, etc., to take further advantage of low surface free energy effects to further enhance moderation without condensation of the depositing vapor atoms. The temperature of the interacting stationary-wall surfaces, such as the chamber walls, the rotating disc surfaces, or the moving walls would be controlled to the proper degree of moderation. In the case of the porous discs, which are capable of storing gas, the outgassing of the absorbed gas within the low pressure of the development chamber could be counteracted by means of a gas feeder system to replenish the supply of stored gas.

Numerous experiments have demonstrated the significantly increased densities provided by the presence of stationary or moving wall surfaces within the development chamber. The woving wall surfaces can also be utilized in accordance with the invention. As a combination, thermalizing surface and intermediate transport whereby zinc atoms of selectively controlled thermal level can be received from the source, transported to the vicinity of the prenucleated recording medium and selectively re-evaporated.

Figure 17:
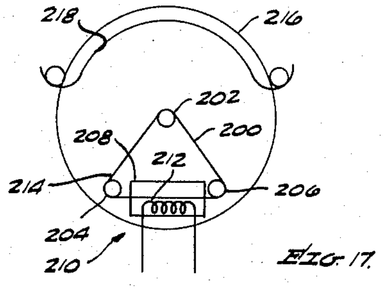
FIG. 17 is a schematic view of another embodiment of an endless belt intermediate transport.

Referring now to FIG. 17, the intermediate transport can take the form of an endless belt 200 disposed in a triangular configuration by means of drive roll 202 and idler rollers 204, 206. The lower portion of the belt 200 passes through a tunnel chamber 208 in which is disposed a broad area source 210, such as a length of zinc-plated coil 212.

The belt is preferably maintained at a fixed temperature by heating the belt by radio frequency, heating eddy current or by radiation from the coil 212. The belt preferably has a very uniform surface of constant free energy to accept a uniform film of low temperature zinc atoms. The belt can suitably be formed of aluminum or copper-clad materials or be made in part from an aluminum zinc alloy. Certain organics, such as Kapton, a polyimide which is stable up to several hundred degrees Co. may also be employed, with or without electrically conductive coatings.

As the belt 200 passes through the tunnel 208, it is loaded with a thin film 214 of zinc. As the belt 200 moves through the chamber 216, it will emit the zinc atoms which will eventually deposit on the nucleated areas of the recording medium 218. The temperature regulation of the belt results in a constant emission rate.

Furthermore, the use of a large area source at low temperature favors the emission of lower thermal energy atoms. The more energetic atoms should be restricted from being emitted from the source. However, if they are permitted to escape, these atoms should be confined by the tunnel 208, for awhile colliding with the surfaces of the tunnel, the belt, and the coil until they are sufficiently thermalized to be deposited subsequently on the belt 200. Thus, both the deposition and emission processes proceed in a more controlled quantitative manner. Furthermore, the transport is selective in qualitatively accepting only the slower and lower thermal energy atoms which are more readily re-evaporated from the belt at lower energy and faster higher density development.

Figure 18:
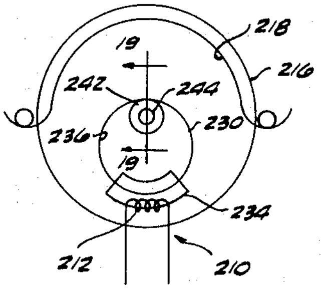
FIG. 18 is a schematic view of a further embodiment of an endless belt intermediate transport.

A further embodiment of a continuous intermediate transport is illustrated in FIG. 18. The transport, in this case, takes the form of a ring, or band 230, again suitably formed of a smooth and uniform material, such as aluminum. The ring is heated by radio frequency, eddy current or radiation from the large area source 210. The coil 212 is housed in an arcuate shape tunnel 234.

Figure 19:
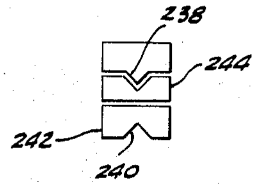
FIG. 19 is a section taken along line 19—19 of FIG. 18.

Referring now to FIG. 19, the interior surface 236 of the ring 230 contains a wedge-shaped projection 238 which rides within a groove 240 in hub 242. The hub is secured on drive axle 242. On rotation of the axle 242, the hub 242 rotates the ring 230 through the tunnel 234.

The low thermal vapor atoms emitted from the source 212 uniformly deposit on the surfaces of the ring. As the zinc-coated ring enters the deposition chamber, the zinc atoms are emitted from the ring and eventually deposit on the prenucleated image areas of the substrate 218.

Figure 20:
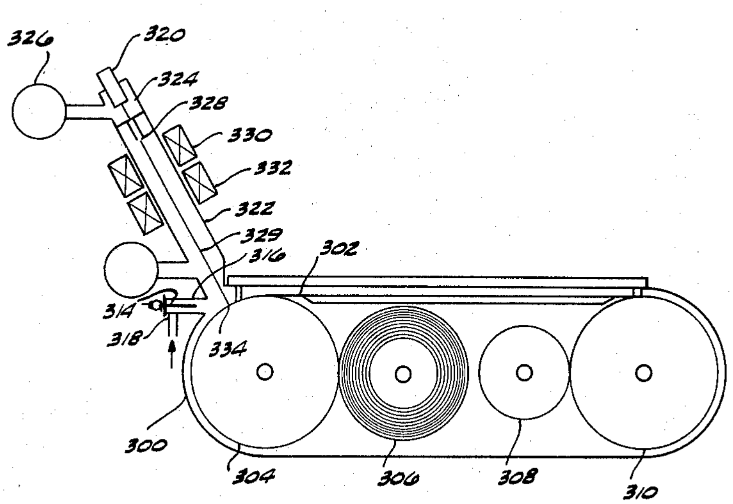
FIG. 20 is a schematic view of a low-tape speed continuous near-real time recording system.

A low tape speed recording system is illustrated in FIG. 20. In a low-tape speed nucleation recorder, images have to be developed within a few millimeters of the writing beam, thus the developing station has to be in the same enclosure 300 and at the same ambient pressure with the writing beam. The tape 302 is transported through the recorder by a drive capstan 304, a feed reel 306, a take-up reel 308 and an idler roll 310.

For electron beam recording, the development process has to be carried out at less than $10^{-4}$ torr ambient to avoid electron scattering. At this low pressure, there is very little probability of thermalization by gas-gas collision and, therefore, special precautions must be practiced to avoid overdevelopment downstream from the writing station.

Low thermal energy atoms are best suited for the development of the slow moving tape and are generated by a large area source 314, such as a copper braid-covered zinc wire. The source 314 is housed within a shroud 316. Even at $10^{-4}$ torr, enough oxygen can leak into the housing 300 to affect the efficiency and life of the source 314. A protective gas, such as hydrogen or nitrogen, can be leaked into the shroud 316 through a selectively permeable plug 318, suitably a platinum foil, in the case of hydrogen.

The electron gun 320 is housed in a separate barrel 322 having an upper chamber 324 for receiving the gun 320. A first diffusion pump 326 maintains the electron gun chamber 324 at $10^{-6}$ torr, and a second pump maintains the writing area at $10^{-4}$ torr. The beam 329 emitted from the gun passes through aperture 328 and is focused and deflected by coils 330, 332 which surround the barrel 322 to form scanning traces which selectively nucleate the surface of the tape 302 at the writing station 334.

The output end of the shroud is directed at a location immediately preceding the writing station 334. The source 314 emits a sufficient number of atoms which are carried to the writing station by the tape 302. Because of the direction superimposed on the atoms by the source and the lateral confinement by the tape edges, most atoms will be captured by the freshly-generated nucleating sites in the scanning beam path. Even though incident rates may exceed $10^{16}$ atoms/cm.$^2$ sec. for the area immediately preceding the freshly-written trace, the overall surface concentration should stay below critical at all times. The removal of the atoms on the sturface of the tape by the leading edge of the continuously-growing 2-dimensional image will equal the incident flux.

In some cases, however, the zinc atoms may not impinge upon the recording medium prior to the electron beam irradiation, because of sub-image formation. It has been observed that the more sensitive recording tape formulations tend to contain a larger number of low free energy sites which are randomly distributed over the surface. Zinc atoms incident upon such a surface will develop an image that is generally not visible to the naked eye, thus termed "sub-image." However, once exposed to the recording electron beam, the already existing sub-image will complete with the real image information resulting in an apparent reduction of the overall sensitivity. Or otherwise stated, the onset of condensation for further development of the sub-image precedes that for the real image in the final development step and, consequently, reduces the differential density to a lower value.

A low-speed tape recording system which incorporates a moving wall development station is generally indicated at 350 in FIG. 22. The recording system 350 is quite similar to the recording system illustrated in FIG. 20. It has a sensitive tape 352, such as those described above, which is transported by a similar reel system through an exposure station 354 to the moving wall development station 356. Writing is accomplished by electron gun 358 which produces a scanned and modulated electron beam 360 which produces the nucleated latent image on the tape. The entire structure is positioned within a suitable enclosure, similar to enclosure 300.

The moving wall developer 356 comprises an endless belt 362 which is engaged around propulsive and guide rollers to define a narrow development chamber slot 364. The tape 352 is preferably made of metallized polyimide, or other material which will not degrade under the temperatures found in the installation. Zinc metal vapor sources 366 and 368 provide for zinc metal vapor in the very narrow development chamber. Zinc atoms are injected from the two sides from sources 366 and 368 (or from the top) and subsequently collide with the wall surfaces of tape 362 and the recording medium 352. Because the walls are not stationary, no zinc deposition occurs, and only the very slow-moving recording tape 352 is able to pick up the atoms. Furthermore, the high frequency of collisions with wall tape 362 extracts excess thermal energy from the zinc atoms leading to a greater optical density. Experiments have shown that in a narrow stationary gap of 4 millimeters only a density of 0.1 could be produced, whereas, with the moving walls, densities of 0.8 to 1.0 resulted under otherwise identical conditions.

After development, the now visible image moves to the flat observation area.

It is to be understood that various thermalization methods and configurations may be used individually, or in combination, to achieve optimum optical contrast. This invention permits development of photographic-like images of photons exposed recording medium maintaining very high resolving power in contrast to the sepia-tone appearance photon-exposed recording medium developed by previous methods which lack sufficient contrast for reflex optical projection.

The images developed in accordance with the invention may comprise a conductive pattern, as for an electrical circuit, or may comprise pictorial, textural or symbolic information to form a permanent recording which may immediately be viewed, read or stored for subsequent reading or viewing.

Recordings made in accordance with the invention may be extremely small without loss of detail and, therefore, great amounts of information may be recorded on small area tapes which need occupy only a small volume, thus being particularly useful for recording and later recall of large masses of information. Since the development process is extremely rapid, taking less than a second to record and develop a fully useful copy, it offers distinctive advantages over photographic techniques presently in use.

The absence of corrosive liquids, time-consuming chemical development processes also is quite advantageous in comparison to present recording techniques, and also permits obtainment of an immediately readable copy upon recording. This is distinctly advantageous, in comparison to the time delay necessitated in waiting for a print-out from a teletype or typewriter recording system. The invention is adaptable to continuously-moving tapes upon which information can be written, recorded and directly read or utilized.

It is to be understood that only preferred embodiments of the invention have been described and that numerous substitutions, alterations and modifications are all permissible without departing from the spirit and scope of the invention, as defined in the following claims.

What is claimed is:

1. The method of forming images on a nucleation recording medium comprising the steps of:
   exposing a portion of the surface of the nucleation recording medium which is sensitive to exposure by directing energetic radiation onto the surface of the nucleation recording medium to form a latent nucleation image thereon, so that nucleation sites are formed on the surface of the medium in accordance with the exposure;
   generating a metal vapor flux at a thermal energy level and directing the metal vapor flux toward the nucleation recording medium and selectively depositing development metal atoms from the vapor onto the latent image of render the latent image on the nucleation recording medium visible, the improvement comprising:
   reducing the thermal energy of the development metal flux as it approaches the latent nucleation image by removal of energy therefrom so that the metal condensing from the vapor onto the latent nucleation image deposits in an amorphous form to form a low specular reflectance, high contrast, optically diffuse, visible metal, image deposit.

2. The method of claim 1 wherein walls are positioned around the path of the metal vapor flux between the source of generation of the metal vapor flux and the surface of the nucleation recording medium and wherein thermal energy reduction is accomplished by permitting some of the metal vapor to impinge upon some of the walls positioned between the source and the latent image.

3. The method of claim 2 wherein permanent deposition of development metal vapor on the walls is inhibited by moving the walls with respect to the latent image.

4. The method of claim 3 wherein gas is located between the generation source of the metal vapor flux and the latent nucleation image which is to be developed and the metal vapor flux passes through the gas from its generation source to its image-producing deposition on the latent image, and the amount of reduction in thermal energy is accomplished by controlling the gas pressure between the source and the latent image because metal vapor flux energy is reduced by collisions between the metal vapor atoms in the flux and the gas.

5. The method of claim 2 wherein gas is located between the generation source of the metal vapor flux and the latent nucleation image which is to be developed and the metal vapor flux passes through the gas from its generation source to its image-producing deposition on the latent image, and the reduction in thermal energy is accomplished by controlling the gas pressure between the source and the latent image because metal vapor flux energy is reduced by collisions between the metal vapor atoms in the flux and the gas.

6. The method of forming image on a nucleation recording medium comprising the steps of:
forming a latent nucleation image on the surface of the nucleation recording medium which is sensitive to radiation, so that nucleation sites are formed by selected exposure to exposure radiation;
generating a development metal vapor flux by heating the solid development metal to a temperature lower than the melting temperature of the solid devtlopment metal;
directing the metal vapor flux toward the nucleation sites on the exposed nucleation recording medium so that the metal is selectively deposited from the vapor onto the latent image to render the latent image visible, in accordance with the original exposure, the energy of the development flux as it approaches the latent nucleation image being sufficiently low due to the low heating temperature of the development metal that the metal condensing from the vapor onto the latent nucleation image deposits in an amorphous form to form a low specular reflectance, high contrast, optically-diffuse, visible metal, image deposit.

7. A nucleation recording medium formed of a radiation sensitive material which has been radiated to form a latent image thereon, and which has been developed by directing a development metal vapor flux of limited thermal energy so that the nucleation recording medium has an image formed by development metal deposition thereon, the improvement comprising:
said image being formed of amorphically deposited metal atoms forming a high contrast, low specular reflectance, optically diffuse, high contrast layer having a reflective density greater than 1.0.

8. The method forming images on a nucleation recording medium comprising the steps of:
exposing a portion of the surface of the nucleation recording medium which is sensitive to exposure by directing energetic radiation onto the surface of the nucleation recording medium to form a latent nucleation image thereon, so that nucleation sites are formed on the surface of the medium in accordance with the exposure;
generating a metal vapor flux at a thermal energy level at a metal vapor flux source and directing the metal vapor flux toward the nucleation recording medium and selectively depositing development metal atoms from the vapor onto the latent image to render the latent image on the nucleation recording medium visible, the improvement comprising:
reducing the thermal energy of the development metal vapor flux between the source of generation of the metal vapor flux and the latent nucleation image by locating gas between the generation source of the metal vapor flux and the latent nucleation image so that the metal vapor flux passes through the gas to its image-producing deposition on the latent image and controlling the thermal energy level of the metal vapor flux at the latent nucleation image by controlling the gas pressure between the metal vapor flux source and the latent image so that metal vapor flux energy is reduced by collisions between the metal vapor atoms in the flux and the gas.

References Cited

UNITED STATES PATENTS

| | | | |
|---|---|---|---|
| 3,317,409 | 5/1967 | Kaspaul et al. | 204—18 |
| 3,462,762 | 8/1969 | Kaspaul et al. | 346—74 |

JOHN C. COOPER III, Primary Examiner

U.S. Cl. X.R.

96—1 R, 1.5; 106—296; 252—501; 346—1

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

Column 2, line 47, delete "Microcircuitory" and insert --Microcircuitry--
(page 4, line 21)

Column 4, line 24, delete "termal" and insert --thermal--.
(page 8, line 24)

Column 6, lines 17 and 18, delete "selection" and insert --selective deposition--
(page 13, line 18)

Column 7, line 21, delete "woudl" and insert --would--
(page 16, line 6)

Column 7, line 38, delete "curve 2" and insert --curve 32--
(page 16, line 22)

Column 8, line 3, delete "mHz" and insert --MHz--
(page 18, line 3)

Column 15, line 18, delete "lead" and insert --led--
(page 36, line 1)

Column 17, line 17, delete "complete" and insert --compete--
(page 41, line 5)

Column 17, line 17, delete "information" and insert --formation--
(page 41, line 6)

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

Cancel Claims 1 through 8 and substitute the following: (See Amendment dated February 21, 1972, filed March 1, 1972)

--1. The method of forming images on a nucleation recording medium comprising the steps of:

exposing a portion of the surface of the nucleation recording medium which is sensitive to actinic exposure by directing actinic radiation onto the surface of the nucleation recording medium to form a latent nucleation image thereon, so that nucleation sites are formed on the surface of the medium in accordance with the exposure, which medium comprises a resinous film-forming vehicle in which is dispersed an actinic ray sensitive compound selected from the group consisting of oxides of titanium, tantalum, indium, magnesium, germanium, zinc, iron, tin and bismuth, sulfides of calcium, zinc, cadmium and indium, and boron nitride, calcium tungstate, beryllium aluminide, lithium carbonate, zinc carbonate, cadmium niobate, lithium niobate, calcium magnesium silicate (cesium-activated) and mixtures thereof, and a metallic salt selected from the group consisting of copper halide, copper (II) acetylacetonate, nickel (II) acetylacetonate, zinc (II) acetylacetonate, chromium (III) acetylacetonate, bismuth trioxide ($Bi_2O_3$), cuprous chloride, a mixture of cuprous chloride and triethylamine salt of tetra cyanoquinomethane, a mixture of cuprous chloride and copper (II) acetylacetonate, a mixture of copper formate and cuprous chloride, cupric sulfate, cupric chloride hydrated with 2 water molecules, cuprous bromide, cuprous iodide, cupric bromide, cuprous sulfite, cupric thiocyanate, cuprous sulfide, cupric molybdate, cupric lactate, cupric formate, copper p-toluene sulfinite, cupric salicylate, cupric linoleate, cupric acetate, glycine cupric salt, cupric stearate, cupric oleate, cupric tartrate, cupric citrate, dextro-levo malic acid copper salt, cupric oxalate, bis (ethyl acetoacetate) copper, bis (1-phenyl 1,3-Butane-dione) copper, cupric dimethyl dithiocarbamate, cuprous sulfate B napthol, cuprous acetylacetonate, silver benzotriazole, tin

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

chloride, nickel chloride, chromium chloride, nickel sulfate, nickel fluoride, silver nitrate, and silver oxide which acts as a nucleation-enhancing compound which acts with the sensitive material upon actinic ray impingement to enhance nucleation so that nucleation sites are formed in accordance with actinic ray exposure;

generating a metal vapor flux from a metal which deposits from the vapor to an amorphous form in the solid comprising a metal selected from the group consisting of zinc, cadmium, selenium, magnesium, mercury, nickel, lead, bismuth, antimony, indium, silver, tin, copper, and gold, at a thermal energy level and directing the metal vapor flux toward the nucleation recording medium and selectively depositing development metal atoms from the vapor onto the latent image to render the latent image on the nucleation recording medium visible, the improvement comprising:

reducing the thermal energy of the development metal flux as it approaches the latent nucleation image by removal of energy therefrom so that the metal condensing from the vapor onto the latent nucleation image deposits in an amorphous form to form a low specular reflectance, high contrast, optically diffuse, visible metal, image deposit.

2. The method of Claim 1 wherein walls are positioned around the path of the metal vapor flux between the source of generation of the metal vapor flux and the surface of the nucleation recording medium and are positioned sufficiently closely to the flux so that thermal energy reduction is accomplished by impingement of some of the metal vapor upon some of the walls positioned along the path between the source and the latent image.

3. The method of Claim 2 wherein said reducing step comprises the step of moving the walls with respect to the latent image.

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

4. The method of Claim 3 wherein gas is located between the generation source of the metal vapor flux and the latent nucleation image which is to be developed and the metal vapor flux passes through the gas from its generation source to its image-producing deposition on the latent image, and the amount of reduction in thermal energy is accomplished by controlling the gas pressure between the source and the latent image in the range whereby metal vapor flux energy is reduced to the extent that said metal deposits in amorphous form.

5. The method of Claim 2 wherein gas is located between the generation source of the metal vapor flux and the latent nucleation image which is to be developed and the metal vapor flux passes through the gas from its generation source to its image-producing deposition on the latent image, and the reduction in thermal energy is accomplished by controlling the gas pressure between the source and the latent image in the range whereby metal vapor flux energy is reduced by collisions between the metal vapor atoms in the flux and the gas to the extent that said metal deposits in amorphous form.

6. The method of forming images on a nucleation recording medium comprising a resinous film-forming vehicle in which is dispersed an actinic ray sensitive compound selected from the group consisting of oxides of titanium, tantalum, indium, magnesium, germanium, zinc, iron, tin and bismuth, sulfides of calcium, zinc, cadmium and indium, and boron nitride, calcium tungstate, beryllium aluminide, lithium carbonate, zinc carbonate cadmium niobate, lithium niobate, calcium magnesium silicate (cesium-activated) and mixtures thereof, and a metallic salt selected from the group consisting of copper halide, copper (II) acetylacetonate, nickel (II) acetylacetonate, zinc (II) acetylacetonate, chromium (III) acetylacetonate, bismuth trioxide ($Bi_2O_3$), cuprous chloride, a mixture of cuprous chloride

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

and triethylamine salt of tetra cyanoquinomethane, a mixture of cuprous chloride and copper (II) acetylacetonate, a mixture of copper formate and cuprous chloride, cupric sulfate, cupric chloride hydrated with 2 water molecules, cuprous bromide, cuprous iodide, cupric bromide, cuprous sulfite, cupric thiocyanate, cuprous sulfide, cupric molybdate, cupric lactate, cupric formate, copper p-toluene sulfinite, cupric salicylate, cupric linoleate, cupric acetate, glycine cupric salt, cupric stearate, cupric oleate, cupric tartrate, cupric citrate, dextro-levo malic acid copper salt, cupric oxalate, bis (ethyl acetoacetate) copper, bis (1-phenyl 1,3-Butane-dione) copper, cupric dimethyl dithiocarbamate, cuprous sulfate B napthol, cuprous acetylacetonate, silver benzotriazole, tin chloride, nickel chloride, chromium chloride, nickel sulfate, nickel fluoride, silver nitrate, and silver oxide which acts as a nucleation-enhancing compound which acts with the sensitive material upon actinic ray impingement to enhance nucleation so that nucleation sites are formed in accordance with actinic ray exposure, comprising the steps of:

forming a latent nucleation image on the surface of the nucleation recording medium which is sensitive to actinic radiation, so that nucleation sites are formed by selected exposure to actinic radiation;

generating a development metal vapor flux from a metal which deposits from the vapor to an amorphous form in the solid comprising a metal selected from the group consisting of zinc, cadmium, selenium, magnesium, mercury, nickel, lead, bismuth, antimony, indium, silver, tin, copper and gold, by heating the solid development metal to a temperature lower than the melting temperature of the solid development metal;

directing the metal vapor flux toward the nucleation sites on the exposed nucleation recording medium so that the metal is selectively deposited from the vapor onto the latent image to render the latent image visible, in accordance with

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

the original exposure, the energy of the development flux as it approaches the latent nucleation image being sufficiently low by control of said generation by heating step to limit the low heating temperature of the development metal so that the metal condensing from the vapor onto the latent nucleation image deposits in an amorphous form to form a low specular reflectance, high contrast, optically-diffuse, visible metal, image deposit.

7. A nucleation recording medium formed of a radiation sensitive material comprising a resinous film-forming vehicle in which is dispersed an actinic ray sensitive compound selected from the group consisting of oxides of titanium, tantalum, indium, magnesium, germanium, zinc, iron, tin and bismuth, sulfides of calcium, zinc, cadmium and indium, and boron nitride, calcium tungstate, beryllium aluminide, lithium carbonate, zinc carbonate, cadmium niobate, lithium niobate,calcium magnesium silicate (cesium-activated) and mixtures thereof, and a metallic salt selected from the group consisting of copper halide, copper (II) acetylacetonate, nickel (II) acetylacetonate, zinc (II) acetylacetonate, chromium (III) acetylacetonate, bismuth trioxide ($Bi_2O_3$), cuprous chloride, a mixture of cuprous chloride and triethylamine salt of tetra cyanoquinomethane, a mixture of cuprous chloride and copper (II) acetylacetonate, a mixture of copper formate and cuprous chloride, cupric sulfate, cupric chloride hydrated with 2 water molecules, cuprous bromide, cuprous iodide, cupric bromide, cuprous sulfite, cupric thiocyanate, cuprous sulfide, cupric molybdate, cupric lactate, cupric formate, copper p-toluene sulfinite, cupric salicylate, cupric linoleate, cupric acetate, glycine cupric salt, cupric stearate, cupric oleate, cupric tartrate, cupric citrate, dextro-levo malic acid copper salt, cupric oxalate, bis (ethyl acetoacetate) copper, bis (1-phenyl 1, 3-Butane-dione) copper, cupric dimethyl dithiocarbamate, cuprous sulfate B napthol, cuprous acetylacetonate, silver benzotriazole, tin chloride,

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

nickel chloride, chromium chloride, nickel sulfate, nickel fluoride, silver nitrate, and silver oxide which acts as a nucleation-enhancing compound which acts with the sensitive material upon actinic ray impingement to enhance nucleation so that nucleation sites are formed in accordance with actinic ray exposure which has been radiated to form a latent image thereon, and which has been developed by directing a development metal vapor flux of limited thermal energy so that the nucleation recording medium has an image formed from a metal which deposits from the vapor to an amorphous form in the solid comprising a metal selected from the group consisting of zinc, cadmium, selenium, magnesium, mercury, nickel, lead, bismuth, antimony, indium, silver, tin, copper, and gold, thereon, the improvement comprising:

said image being formed of amorphically deposited metal atoms imagewise deposited from low thermal energy metal vapor forming a high contrast, low specular reflectance, optically diffuse, high contrast layer having a reflective density greater than 1.0.

8. The method of forming images on a nucleation recording medium comprising a resinous film-forming vehicle in which is dispersed an actinic ray sensitive compound selected from the group consisting of oxides of titanium, tantalum, indium, magnesium, germanium, zinc, iron, tin and bismuth, sulfides of calcium, zinc, cadmium and indium, and boron nitride, calcium tungstate, beryllium aluminide, lithium carbonate, zinc carbonate, cadmium niobate, lithium niobate, calcium magnesium silicate (cesium-activated) and mixtures thereof, and a metallic salt selected from the group consisting of copper halide, copper (II) acetylacetonate, nickel (II) acetylacetonate, zinc (II) acetylacetonate, chromium (III) acetylacetonate, bismuth trioxide ($Bi_2O_3$), cuprous chloride, a mixture of cuprous chloride and triethylamine salt of tetra cyanoquinomethane, a mixture of cuprous chloride and copper (II) acetylacetonate, a

PO-1050 (5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

mixture of copper formate and cuprous chloride, cupric sulfate, cupric chloride hydrated with 2 water molecules, cuprous bromide, cuprous iodide, cupric bromide, cuprous sulfite, cupric thiocyanate, cuprous sulfide, cupric molybdate, cupric lactate, cupric formate, copper p-toluene sulfinite, cupric salicylate, cupric linoleate, cupric acetate, glycine cupric salt, cupric stearate, cupric oleate, cupric tartrate, cupric citrate, dextro-levo malic acid copper salt, cupric oxalate, bis (ethyl acetoacetate) copper, bis (1-phenyl 1,3-Butane-dione) copper, cupric dimethyl dithiocarbamate, cuprous sulfate B napthol, cuprous acetylacetonate, silver benzotriazole, tin chloride, nickel chloride, chromium chloride, nickel sulfate, nickel fluoride, silver nitrate, and silver oxide which acts as a nucleation-enhancing compound which acts with the sensitive material upon actinic ray impingement to enhance nucleation so that nucleation sites are formed in accordance with actinic ray exposure, comprising the steps of:

exposing a portion of the surface of the nucleation recording medium which is sensitive to exposure by directing energetic radiation onto the surface of the nucleation recording medium to form a latent nucleation image thereon, so that nucleation sites are formed on the surface of the medium in accordance with the exposure;

generating a metal vapor flux from a metal which deposits from the vapor to an amorphous form in the solid comprising a metal selected from the group consisting of zinc, cadmium, selenium, magnesium, mercury, nickel, lead, bismuth, antimony, indium, silver, tin, copper, and gold at a thermal energy level at a metal vapor flux source and directing the metal vapor flux toward the nucleation recording medium and selectively depositing development metal atoms from the vapor onto the latent image to render the latent image on the nucleation recording medium visible, the improvement comprising:

PO-1050
(5/69)

UNITED STATES PATENT OFFICE
CERTIFICATE OF CORRECTION

Patent No. 3,671,238 Dated June 20, 1972

Inventor(s) Alfred F. Kaspaul and Erika E. Kaspaul

It is certified that error appears in the above-identified patent and that said Letters Patent are hereby corrected as shown below:

reducing the thermal energy of the development metal vapor flux between the source of generation of the metal vapor flux and the latent nucleation image by locating gas between the generation source of the metal vapor flux and the latent nucleation image so that the metal vapor flux passes through the gas to its image-producing deposition on the latent image and controlling the thermal energy level of the metal vapor flux at the latent nucleation image by controlling the gas pressure between the metal vapor flux source and the latent image so that metal vapor flux energy is reduced by collisions between the metal vapor atoms in the flux and the gas to control the imagewise metal deposition for enhancing metal contrast.--

Signed and sealed this 6th day of March 1973.

(SEAL)
Attest:

EDWARD M.FLETCHER,JR.
Attesting Officer

ROBERT GOTTSCHALK
Commissioner of Patents